Patented Mar. 12, 1935

1,994,379

UNITED STATES PATENT OFFICE 1,994,379

IRON-BEARING BRIQUETTE AND METHOD OF MAKING THE SAME

Clyde E. Williams and John D. Sullivan, Columbus, Ohio, assignors to The Battelle Memorial Institute, Columbus, Ohio, a corporation of Ohio No Drawing. Application January 6, 1934, Serial No. 705,624

20 Claims. (Cl. 75—48)

Our invention relates to iron-bearing briquettes and method of making the same. It is particularly applicable to the making of briquettes for use in open-hearth furnaces and in blast furnaces, though it is not necessarily limited thereto.

In the practice of manufacturing open-hearth steel, iron oxide in the form of lumps of iron ore is added to the charge for the purpose of reducing the carbon content of the steel. This iron ore usually comprises about 5% of the weight of the charge. Roughly, half of the iron ore is added with some fluxes to the bottom of the furnace before the metallic charge is introduced. The other half of the iron ore is added after the charge has become molten and there is a slag layer on top of the molten metal. In blast-furnace practice, the iron ore is introduced at the top of the furnace and gradually works down into the smelting zone.

In both types of manufacture, attempts have been made to replace a portion of the iron ore by flue dust or mill scale for the purpose of utilizing waste or by-products. Usually, the flue dust or mill scale is sintered before introduction into the blast furnace. This sintered product is impracticable for use in open-hearth furnaces because it is of insufficient density. Some effort has been made to bind the flue dust or mill scale together by the addition of ground slag or other inert material in order to facilitate the use thereof. However, the addition of inert material to the charge is obviously undesirable, since more flux is required and the slag burden is increased. Likewise, the binder used is frequently of such a nature that it becomes ineffective before the iron oxide has gravitated to the proper zone. This is frequently true whether the flue dust or mill scale is bound into the form of a briquette or into other lump form.

The prior art indicates, also, that clay has been used alone as a binder for finely divided ore or flue dust. However, the use of clay alone results in the addition of such a large amount of inert material that an undesirably large amount of basic fluxes is required and the amount of slag produced is increased. Moreover, briquettes made with clay as the only binder are not permanent and are susceptible to weathering. They are especially likely to disintegrate if they become wet.

Some briquettes of the type indicated have been made with cement only as a binder. However, this is expensive and, in addition, briquettes so made do not possess sufficient green strength for handling.

One of the objects of this invention is to provide a method whereby mill scale, iron ore or other similar materials too fine for direct utilization, may be bound together to form a part of the charge in an open-hearth furnace or in a blast furnace. More particularly, an object is to provide a binder for material of this type which will give the product green strength to enable handling.

Another object of this invention is to provide a binder of such form as will impart permanent or final strength to the product, while, at the same time, giving such product adequate green strength.

Another object of this invention is to provide a briquette which will be adequately resistant to varying weather and atmospheric conditions.

Various other objects will appear as this description progresses.

This application is a continuation, in part, of our application, Serial No. 661,415, filed March 17, 1933.

Our invention contemplates the binding of mill scale, finely divided iron ore, flue dust or the like, into briquette form by the use of a combination of clay and cement. Preferably, the clay is of a plastic nature. We may use any hydraulic cement, but we preferably use a cement such as Portland or a dolomite cement of the type to be subsequently described.

In the performance of our method, the mill scale or other iron-bearing material is mixed with clay and cement and with a sufficient quantity of water to render the cement hydraulic, to ensure that the clay will be plastic, and to facilitate the proper packing of the mixture. The percentage of water added will depend upon the nature and character of the mill scale or other iron-bearing material and, also, upon the amount of binder used. The amount of water, however, may vary over wide limits and depends, to a certain extent, on the nature of the scale or other iron-bearing material. In the use of mill scale, we have found that some such scales are dryer than others and that some are more finely pulverized than others. Mill scales that are dryer or more finely pulverized require a larger amount of water.

More specifically, the method which we use for producing briquettes which embody mill scale as the iron-bearing constituent, preferably contemplates the use of such proportions of mill scale and binder that the briquette, when dry, will embody about 90% to 95%, by weight, of mill scale. In conjunction with this mill scale, we use a binder of clay and hydraulic cement which is approximately 5% to 10%, by weight, of the mill scale. Water is added in sufficient amount to set the cement, to render the clay plastic and to permit effective packing of the composition. For some purposes, we have found that the use of water in ratio of from 6% to 12% of the weight of the mill scale is satisfactory. However, we do not desire to limit ourselves to this amount of water, since smaller or larger quantities thereof may be utilized.

The composition containing these ingredients is thoroughly mixed in any suitable mixer and subjected to pressure. The amount of pressure depends upon the use to which the briquettes are to be put. We have successfully made briquettes in a brick press, employing a pressure of about 5500 to 6000 lbs./sq. in. With such pressure, we have been able to produce mill-scale briquettes having a density greater than 3.8, which is particularly desirable where the briquettes are to be used in open-hearth furnaces and should have adequate density to sink through the slag overburden before disintegration. The density may be varied as desired, particularly in the making of briquettes for use in blast furnaces. The density will also vary with the nature and kind of the scale or other iron-bearing material which is bound together by the binder. We may, of course, produce briquettes of sufficient density for use in open-hearth furnaces by employing pressures lower than 5500 to 6000 lbs./sq. in. Substantial pressure, however, is desirable to give adequate density.

To facilitate in handling without breakage, we preferably produce pillow-shaped briquettes. These seem to require less binder and to provide a minimum number of sharp edges which are liable to be broken off. Obviously, however, the size and shape of the briquettes made by our method may be varied at will. Our briquettes may be further protected from disintegration due to atmospheric or weather conditions by treating the briquettes after their formation with an oil-water emulsion capable of producing a water-resistant film. We preferably accomplish this by dipping the briquettes in an emulsion consisting of 1 part of oil and 7 parts of water, though it will be obvious that other oil-water ratios or emulsions may be suitable. Briquettes so treated are comparatively water-proof and do not disintegrate upon exposure to atmospheric and other weather conditions for several months. Obviously, the water-proofing material may be applied in other ways than by dipping.

It is desirable that the briquettes be kept moist for a period of time, preferably at least twenty-four hours, to allow the cement to set. The briquettes are preferably dried before they are used.

We may utilize various ratios and percentages of clay and cement. For example, we have prepared briquettes of suitable physical properties for use in open-hearth furnaces with clay and Portland cement as a binder and with each constituting 2½% of the weight of mill scale. We have also prepared suitable briquettes with clay and Portland cement as binders and with each constituting 5% of the weight of the mill scale.

Still different ratios of clay and cement have been used to produce satisfactory products. For example, we have used clay in ratio of 5% of the weight of the mill scale and Portland cement in varying ratios of 1, 2, 3 and 4% of the weight of the mill scale. All of these combinations yielded satisfactory briquettes. Dolomite or other hydraulic cements may be used in place of Portland cement in the same percentage and ratio.

Our tests indicate that the lower limit of either dolomite or Portland cement when used alone is about 2½% of the weight of the mill scale, though certain conditions may permit the use of a smaller percentage of the cement. If clay alone is used as a binder, it is apparently desirable to use on no less than 5% of the weight of the mill scale.

Requirement for dolomite cement and clay when used in combination as a binder are about the same as clay and Portland cement. By increasing the percentage of clay to 5%, 1% of either dolomite or Portland cement will, in combination with the clay, serve as an effective binder and produce a satisfacory product. It has also been found that a combination of 5% of clay and 2% of Portland cement gives a binder and product of excellent strength. We may even utilize combinations containing 2½% of clay and 1% or more of Portland, dolomite or other hydraulic cement.

The dolomite cement which we use in producing this composition is preferably produced by the use of natural dolomite or dolomitic limestone, it being desirable that the limestone be moderately high in magnesium. To this, we preferably add iron or aluminum oxide and silica. These ingredients are so proportioned to each other that they will render possible the production of a clinker which is stable, in that it is free from danger of slaking or dusting.

These ingredients are preferably first mixed and then ground to powdered form. This mixture is then burned at a temperature and for a period of time which will produce a clinker consisting essentially of periclase, tricalcium silicate and calcium ferrite, or calcium aluminate, if alumina is used instead of iron oxide. The product is especially characterized by its high content of tricalcium silicate, its low content of dicalcium silicate, and its crystals of free periclase.

The amount of iron oxide and silica added as fluxes is important. Clinker containing incorrect amounts is unstable. By a stable clinker is meant one that will not slake or dust. Slaking is caused by the presence of free lime and dusting is caused by conversion of beta to gamma dicalcium silicate. This conversion takes place at about 675° C. during cooling of the clinker. Clinkers containing less than 5% of silica are unstable, owing to slaking. Clinkers containing over 8% to 12% of silica, the limit depending on the amount of iron oxide present, are unstable, owing to dusting. Between the slaking and the dusting fields lies the stable range of clinker. Thus any clinker made by using 5% to 8% of silica in the raw materials is stable, providing the iron oxide content, expressed as $Fe_2O_3$, is above 2%. The limits of amounts of silica and iron oxide to make stable clinker are broad enough to make manufacturing control easy and practicable. The percentage of flux added is based on the weight of raw materials used and not on the percentages in the burned clinker. Thus 7% of silica and 7% of ferric oxide as fluxes indicate that the raw materials consist of 86% of dolomite, 7% of silica, and 7% of ferric oxide.

The following compositions of raw materials yield satisfactory stable clinkers: 5% of silica and 3% to 15% of iron oxide, expressed as $Fe_2O_3$;

6% of silica and 1% to 15% of iron oxide; 7% of silica and .5% to 15% of iron oxide; 8% of silica and 0.5% to 10% of iron oxide; 9% of silica and 1% to 5% of iron oxide; 10% of silica and 1% to 3% of iron oxide; and 11% of silica and 2% of iron oxide. It is understood that it is not necessary to use integral percentages of silica and iron oxide. Fractional percentages can be used. It is also understood that equivalent amounts of aluminum or other oxides can be used to replace the iron oxide without appreciably changing the limits outlined. The clinkers containing 6% to 9% of silica and 2% to 5% of iron oxide are especially suitable. The above are given only as examples of combinations yielding stable clinkers and it is understood that our invention is not necessarily limited to these examples, since the invention covers the entire range of composition of dolomite, silica, and iron oxide or other oxide that yields stable clinkers. Stable clinker is characterized by nearly all the silica being present as tricalcium silicate and enough iron or aluminum being present to stabilize the beta dicalcium silicate.

The temperature utilized and the time of application thereof which are necessary to produce a stable clinker which will be substantially free from slaking or dusting may vary somewhat, depending upon the ingredients of the mixture. Preferably, this mixture should be subjected to a temperature of 2700° F. and it is desirable that this temperature be maintained for an hour or more, though the addition of soda ash to the mixture may permit of a slightly lower temperature or a shorter period of time or both. It is sometimes advantageous to employ temperatures of 2900° F. or higher. In any event, the temperature should be sufficiently high and applied for sufficient length of time to insure that there will be produced a clinker comprised essentially of tricalcium silicate, calcium ferrite or aluminate and periclase. The stable clinker made in the manner outlined above is finely ground to a powder. This powder has hydraulic properties and is designated as dolomite cement.

It has already been pointed out that iron ore, flue dust or similar materials may be formed into briquettes with the use of our clay-cement binder by the same process used in making mill-scale briquettes. However, the proportionate amount of the binder will vary somewhat, depending upon the inherent density of the iron ore, flue dust, or similar material and on the impurities which these materials contain. Likewise, as previously pointed out, the degree of pressure used in forming briquettes will vary in accordance with the uses to which they are to be put. Also, we may use more than 10% of binder in making the briquette, though we prefer not to do so, particularly if these briquettes are to be used in the open-hearth process. The amount of binder that is used is dependent, to some extent, upon the degree of pressure that is used, less binder being required with relatively high pressures.

It will be apparent that we have provided a novel and important method of rendering mill scale, iron ore, flue dust, or similar products available as a substitute for a portion of the ore which is normally required to make up the charge either of an open-hearth furnace or a blast furnace. Mill scale is essentially an oxide of iron which approximates in chemical composition the magnetic oxide of iron Fe₃O₄. It is usually found in thin pieces or flakes and is bulky in nature. This is especially true of rolling mill scale. Owing to the low specific gravity of this material, it cannot be effectively introduced into open-hearth furnaces or blast furnaces in its natural state. This is also true of fine iron ore, flue dust and various other materials containing iron oxide.

Our process and product possess numerous advantages. In the first place, we have provided a simple way of rendering useful such finely divided iron-containing materials as mill scale, fine iron ore, flue dust and the like. In the second place, we have provided a binder which gives ample green strength and which on setting gives more than adequate strength to the product. Furthermore, a relatively small amount of clay will suffice when it is used in combination with the cement, and as a result of this decrease in the amount of inert material in the binder, the amount of basic fluxes required and the amount of slag produced are consequently decreased.

On the other hand, the use of the clay decreases the amount of cement that must be used and, consequently, lowers the cost. The briquettes thus produced are permanent and are not susceptible to weathering or to disintegration upon becoming wet. Utilization of the combination of clay and cement as a binder permits the manufacture of a briquette that possesses green strength, by virtue of the clay, and permanent strength, by virtue of the cement. Such briquettes can be handled when newly made and do not disintegrate on standing. In fact, they gain in strength for a long period of time.

By the use of our binder in conjunction with mill scale, we render possible the substitution of the mill scale for a portion of the charge. Moreover, since our mill-scale briquettes normally have about 70% of iron in them, it becomes possible to use a lower grade iron ore in conjunction with these mill-scale briquettes, while at the same time maintaining the average iron content of the total charge high enough to satisfy the usual blast-furnace requirements.

Another advantage of our invention arises from the treatment of the surfaces of the briquettes with the more or less water-proof emulsion. This permits the briquettes to be subjected to the weather and atmospheric conditions, as in open-air storage or shipment, without injury to the products.

While the advantages of using mill scale have been somewhat stressed in the above description, the use of iron ore in the production of our briquettes is likewise important. The recent tendency towards the use of concentration methods for the beneficiation of iron ores has resulted in the increased production of material finer in state of subdivision than lump ore which until recent times has been the only kind shipped from the mines. This fine iron ore, in its natural condition, is unsuitable for use either in the open-hearth or blast furnace. However, when embodied into briquette form in accordance with our method, it may be used effectively both in open-hearth furnaces and in blast furnaces. Furthermore, the formation of the briquettes by pressure, as indicated, makes possible the use of clay and cement as binder without use of excessive amounts of binder as would be required if pressure were not utilized. Thus, we are able, by the use of the binder described in accordance with our method, to utilize effectively fine iron ore both in open-hearth and blast furnaces.

In the foregoing description and the appended claims, the term "iron-bearing briquette" refers to one made from mill scale, flue dust, iron ore, or like forms of iron compounds.

The term "mill scale" as used in the foregoing specification and appended claims is to be understood to mean the coating of iron oxide which forms on the surface of the metal when heated and which is broken off after its formation. As used in this invention, it is intended to include such forms of scale as roll scale, hammer scale, furnace scale from annealing, normalizing, and sundry operations, soaking pit scale, and the like.

The term "dolomite cement" as used in the description and claims refers to the hydraulic product obtained by reducing to powdered form a stable clinker made by firing a proper mixture of dolomite, silica, and iron oxide or aluminum oxide at such a temperature and for such a period of time as to produce a clinker consisting essentially of periclase, tricalcium silicate, and calcium ferrite or calcium aluminate, and containing sufficient of either of the aforesaid metal oxides to stabilize any beta dicalcium silicate that may be present.

Having thus described our invention, what we claim is:

1. The method of making an iron-bearing briquette which comprises mixing an iron-containing material selected from a group comprising mill scale, flue dust, iron ore and the like and a binder comprising unburned clay and hydraulic cement together with sufficient water and subjecting such mixture to pressure sufficient to form a briquette.

2. The method of making an iron-bearing briquette which comprises mixing an iron-containing material selected from a group comprising mill scale, flue dust, iron ore and the like, and a binder comprising unburned clay and Portland cement together with sufficient water and subjecting said mixture to pressure sufficient to form a briquette.

3. The method of making an iron-bearing briquette which comprises mixing an iron-containing material selected from a group comprising mill scale, flue dust, iron ore, and the like, and a binder comprising unburned clay and dolomite cement together with sufficient water, and subjecting said mixture to pressure sufficient to form a briquette.

4. The method of making an iron-bearing briquette which comprises mixing an iron-containing material selected from a group comprising mill scale, flue dust, iron ore and the like, and a binder comprising unburned clay and a hydraulic cement together with sufficient water, and subjecting the mixture to sufficient pressure to form a briquette which in final form has a density that will insure its gravitation through the slag layer to the metal bath of an open-hearth furnace.

5. The method of making an iron-bearing briquette which comprises mixing an iron-containing material selected from a group comprising mill scale, flue dust, iron ore and the like, and a binder comprising unburned clay and Portland cement together with sufficient water, and subjecting the mixture to sufficient pressure to form a briquette which in final form has a density that will insure its gravitation through the slag layer to the metal bath of an open-hearth furnace.

6. The method of making an iron-bearing briquette which comprises mixing an iron-containing material selected from a group comprising mill scale, flue dust, iron ore and the like, and a binder comprising unburned clay and dolomite cement together with sufficient water, and subjecting the mixture to sufficient pressure to form a briquette which in final form has a density that will insure its gravitation through the slag layer to the metal bath of an open-hearth furnace.

7. The method of making a mill-scale briquette which comprises mixing mill scale and a binder comprising unburned clay and hydraulic cement together with sufficient water, and subjecting the mixture to pressure sufficient to form a briquette which in final form has a density that will insure its gravitation through the slag layer to the metal bath of an open-hearth furnace.

8. The method of making a mill-scale briquette which comprises mixing mill scale and a binder comprising unburned clay and hydraulic cement together with sufficient water, and subjecting the mixture to pressure sufficient to form a briquette.

9. The method of making an iron-bearing briquette which comprises mixing an iron-containing material selected from a group comprising mill scale, flue dust, iron ore and the like, and a binder comprising unburned clay and a hydraulic cement together with sufficient water, subjecting said mixture to pressure sufficient to form a briquette, keeping said briquette moist until the cement has set, and drying the briquette thus formed.

10. The method of making an iron-bearing briquette which comprises mixing an iron containing material selected from a group comprising mill scale, flue dust, iron ore and the like, and a binder comprising unburned clay and hydraulic cement together with sufficient water, subjecting the mixture to pressure sufficient to form a briquette which in final form has a density that will insure its gravitation through the slag layer to the metal bath of an open-hearth furnace, keeping said briquette moist until the cement has set, and drying the briquette thus formed.

11. An iron-bearing briquette comprising an iron-containing material selected from a group comprising mill scale, iron ore, flue dust and the like, and a binder comprising unburned clay and hydraulic cement for binding said materials together into a unitary mass.

12. An iron-bearing briquette comprising an iron-containing material selected from a group comprising mill scale, iron ore, flue dust and the like, and a binder comprising unburned clay and Portland cement for binding said materials together into a unitary mass.

13. An iron-bearing briquette comprising an iron-containing material selected from a group comprising mill scale, iron ore, flue dust and the like, and a binder comprising unburned clay and dolomite cement for binding said materials together into a unitary mass.

14. An iron-bearing briquette comprising an iron-containing material selected from a group comprising mill scale, iron ore, flue dust and the like, and a binder comprising unburned clay and a hydraulic cement for binding said materials together into a unitary mass, said briquette having a density sufficient to insure its gravitation through the slag layer to the metal bath of an open-hearth furnace.

15. An iron-bearing briquette comprising an iron-containing material selected from a group comprising mill scale, iron ore, flue dust and the like, and a binder comprising unburned clay and Portland cement for binding said materials together into a unitary mass, said briquette having a density sufficient to insure its gravitation through the slag layer to the metal bath of an open-hearth furnace.

16. An iron-bearing briquette comprising an iron-containing material selected from a group comprising mill scale, iron ore, flue dust and the like, and a binder comprising unburned clay and dolomite cement for binding said materials together into a unitary mass, said briquette having a density sufficient to insure its gravitation through the slag layer to the metal bath of an open-hearth furnace.

17. An iron-bearing briquette comprising an iron-containing material and a binder of unburned clay and cement so proportioned and compressed that it has adequate density.

18. An iron-bearing briquette comprising an iron-containing material selected from a group comprising mill scale, flue dust, iron ore or similar material, and a binder comprising unburned clay and a hydraulic cement, and water; said briquette having a density sufficient to insure its gravitation through the slag layer to the metal bath of an open-hearth furnace.

19. An iron-bearing briquette containing at least 90 per cent of mill scale, flue dust, iron ore or similar material, and a binder comprising unburned clay and a hydraulic cement for binding said materials into a unitary mass, said briquette being so compressed that it has adequate density to insure its gravitation through the slag layer to the metal bath of an open-hearth furnace.

20. A mill-scale briquette containing 90 per cent or over of mill scale, a binder of unburned clay and hydraulic cement, and water so compressed that the said briquette has adequate density to insure it gravitation through the slag layer to the metal bath of an open-hearth furnace.

CLYDE E. WILLIAMS.
JOHN D. SULLIVAN.